April 21, 1942.　　W. C. BROEKHUYSEN　　2,280,056
VIBRATOR MECHANISM FOR TOBACCO FEEDS AND THE LIKE
Filed June 23, 1939　　3 Sheets-Sheet 1
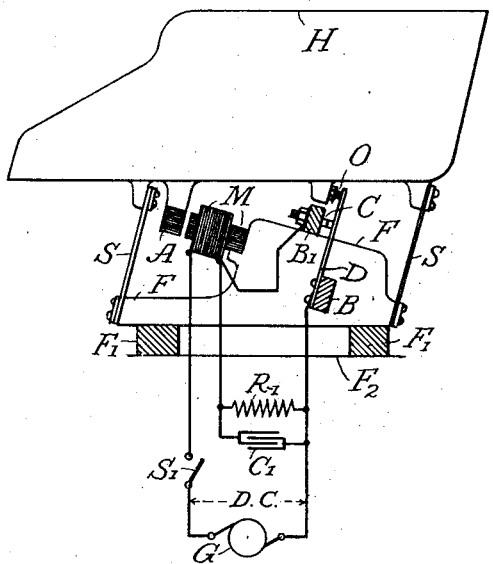
Fig. 1.
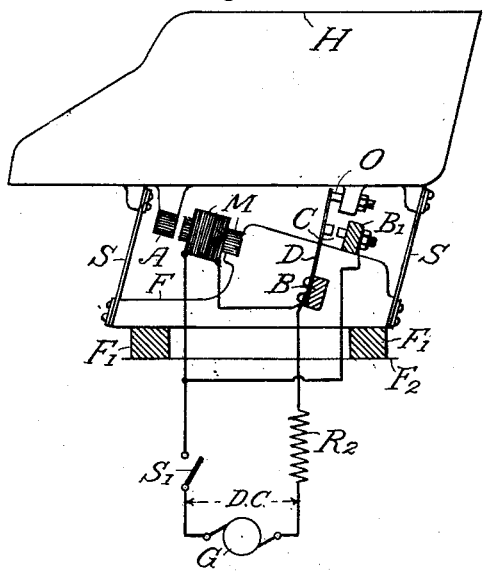
Fig. 2.
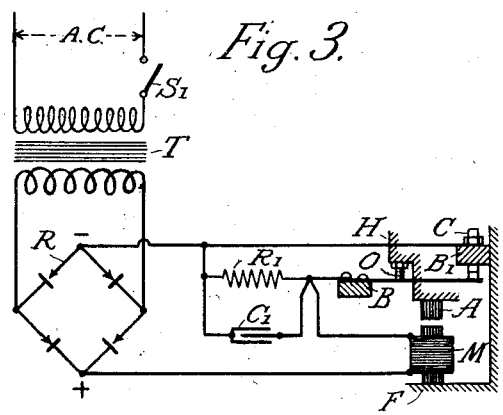
Fig. 3.
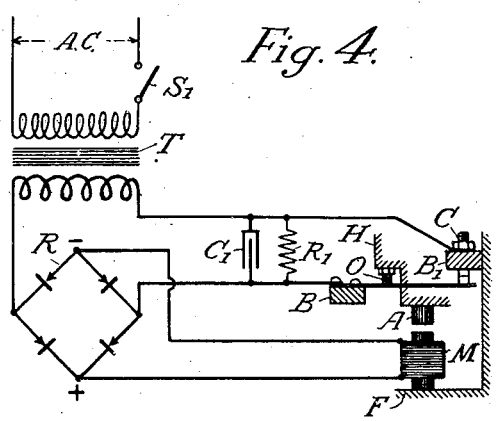
Fig. 4.
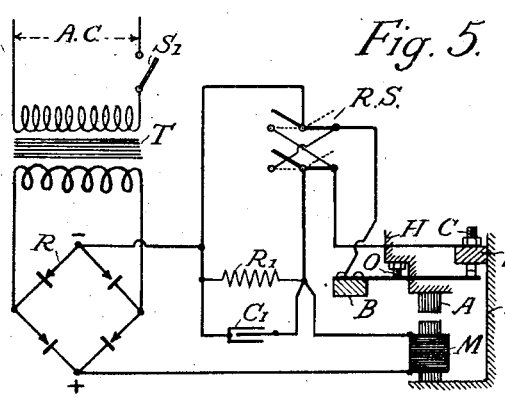
Fig. 5.
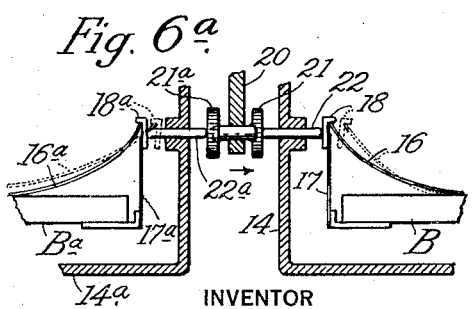
Fig. 6ª.
INVENTOR
Wm. C. Broekhuysen
BY George S. Harling
ATTORNEY April 21, 1942. W. C. BROEKHUYSEN 2,280,056
VIBRATOR MECHANISM FOR TOBACCO FEEDS AND THE LIKE
Filed June 23, 1939 3 Sheets-Sheet 2
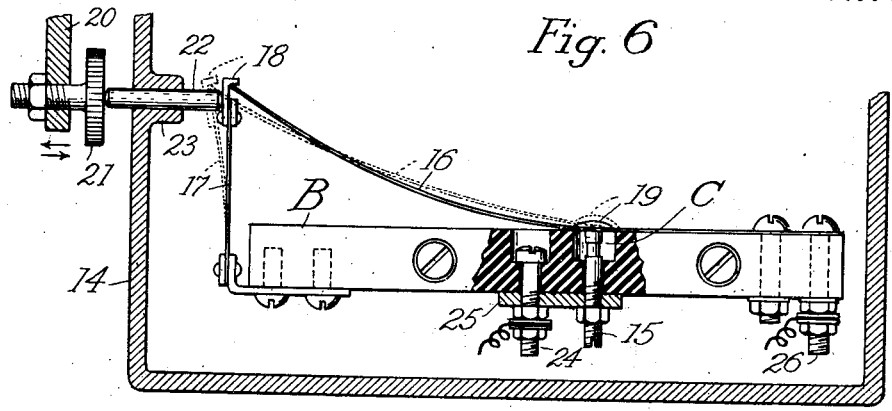
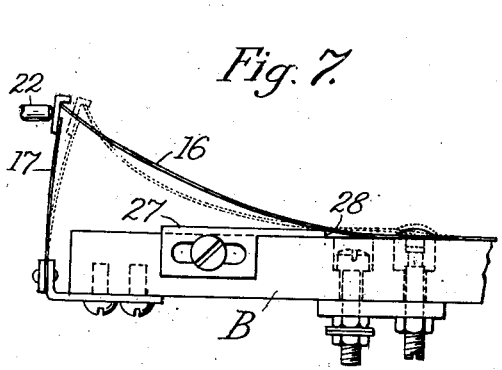
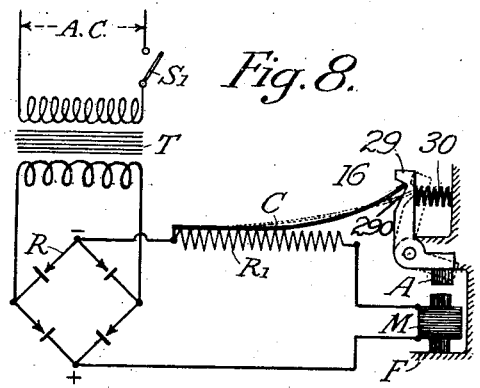
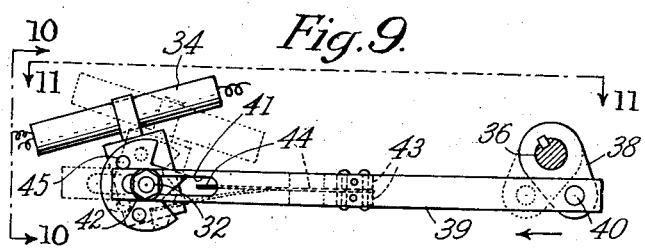
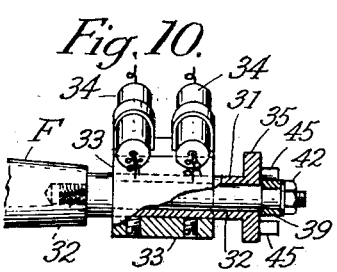
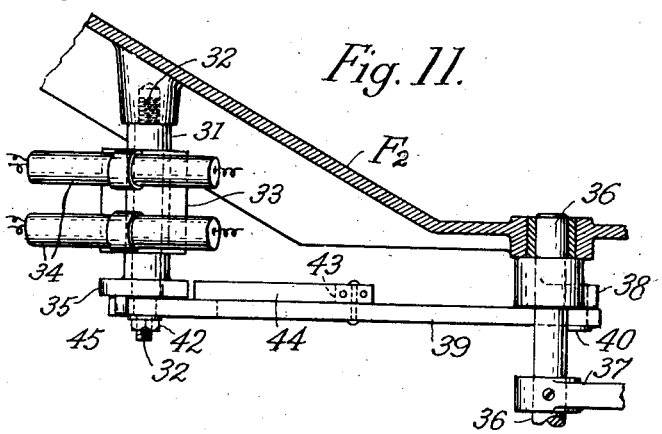
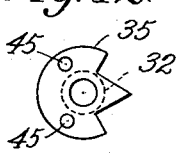
INVENTOR
Wm. C. Broekhuysen
BY George S Hastings
ATTORNEY Patented Apr. 21, 1942

2,280,056

UNITED STATES PATENT OFFICE 2,280,056

VIBRATOR MECHANISM FOR TOBACCO FEEDS AND THE LIKE

William C. Broekhuysen, Brooklyn, N. Y., assignor to International Cigar Machinery Company, a corporation of New Jersey Application June 23, 1939, Serial No. 280,686

8 Claims. (Cl. 198—220)

This invention relates to vibrator mechanisms, and more particularly to improved devices for operating said mechanisms, its objects being to so devise an electric vibrator that any frequency of vibration may be obtained regardless of the frequency of the current source used in operating the vibrator.

In the past, in vibrators operating directly on alternating current or through a half-wave rectifier, the weights and springs forming a part of the structure of the feeding device have had to be tuned to near-resonance with the frequency of the source. At exact resonance, the power required would be the smallest, but this has been found not to be a practical condition because the slightest change in the load on the vibrator or of the frequency of the current source acts to reduce substantially the amplitude of vibration.

According to my invention, however, I have provided a contact system for operating magnetic vibrators for feeding and handling material. The chief advantage of my invention over vibrators operating directly on A. C. current or through half-wave rectifiers is that when operating through a contact the frequency is determined almost entirely by the weight or mass of the vibrating parts, and the characteristics of the energy storing members connecting or supporting them. This is called the natural frequency of the vibrator. It will be seen, therefore, that by properly proportioning the weights and members, any desired frequency may be obtained regardless of the frequency of the source of the current. Since the lowest frequency at which a vibrator can be operated directly on 60 cycle alternating current is 3600 per minute (using a half-wave rectifier) and this frequency produces a very noticeable and objectionable hum, my invention results in a particular advantage, especially where a low vibration frequency is required for silent operation.

It is a further object of the invention to provide a vibrator with a contact which will always operate at a frequency requiring the minimum amount of power and one in which whenever the load changes the frequency will change.

It is a further object of the invention to provide a vibrator with a contact wherein a change in the frequency of the current source will have no effect and one in which it is possible to use a smaller vibrating inducing unit, and at the same time achieve an improvement in the stability of speed of feeding material by said vibrator.

It is a further object of the invention to provide vibrators with contacts so that the necessity of tuning all vibrators to the same frequency is eliminated thereby simplifying their manufacture. Because of this feature, if a large number of vibrators are installed in one room, the objectionable result of having all vibrators in exact synchronism is avoided because it is very unlikely that any two vibrators with contacts will synchronize for any length of time. This will cut down any undesirable noise which might result from a plurality of vibrators operating in synchronism.

With these and other objects not specifically mentioned in view, the invention consists in certain combinations and constructions which will be hereinafter fully described, and then specifically set forth in the claims hereunto appended.

In the accompanying drawings which form a part of this specification, and in which like characters of reference indicate the same or like parts:

Figs. 1 and 2 are diagrammatic illustrations of electrical connections for operating a vibrator with a contact, showing the vibrator applied to a hopper for feeding tobacco;

Figs. 3, 4, and 5 are diagrams of other modifications of electrical connections suitable for operating a vibrator with contact;

Fig. 6 is a side elevation of an improved vibrator contact;

Fig. 6a is a partial side elevation of a combination of two of the vibrator contacts shown in Fig. 6;

Fig. 7 is a partial side elevation showing a modification of the vibrator contact disclosed in Fig. 6;

Fig. 8 is a diagram showing another modification of the vibrator contact and circuit;

Fig. 9 is a side elevation of a suitable reversing switch mechanism which may be used in conjunction with a vibrator with contact;

Fig. 10 is an end view on line 10—10 of Fig. 9;

Fig. 11 is a plan view on line 11—11 of Fig. 9;

Fig. 12 is a detail showing a reversing cam for actuating the switch shown in Figs. 9–11.

Figure 13:
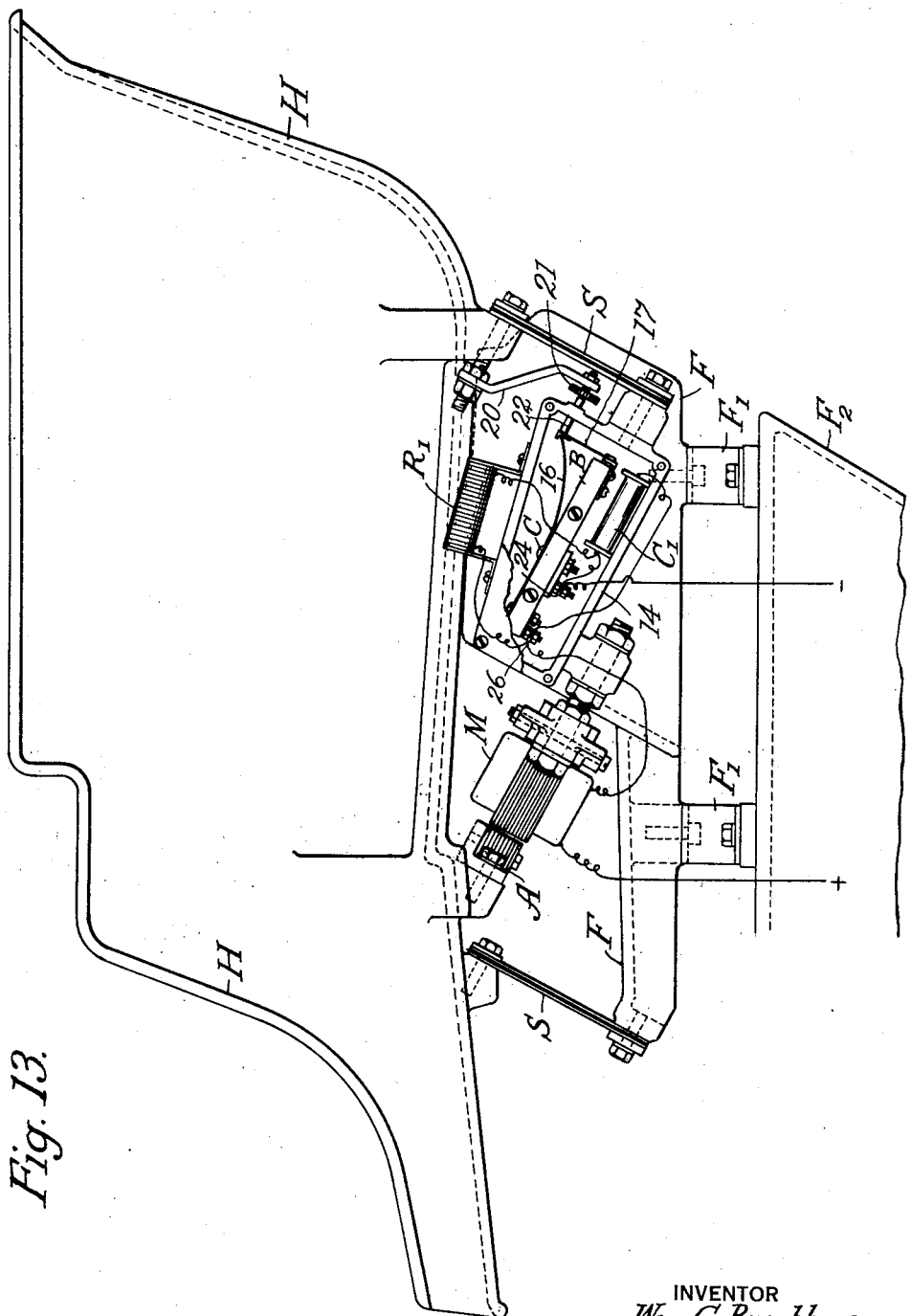
Fig. 13 is a side elevation of a tobacco feed device for a cigar bunch machine showing installed thereon an improved contact for operating a vibrator which effects the feed of tobacco from the hopper.

Referring to the drawings, it will be observed that I have shown several forms of devices suitable for operating the contact vibrator. While it is not impossible to operate a contact vibrator on alternating current, it has been found impractical for larger magnets, such for instance as those required in feeding tobacco to cigar bunch machines and the like, because of the heavy arcing at the contact. According to my invention, therefore, it is proposed to use direct current, which may be obtained from any suitable source, such as a generator, as shown in Figs. 1 and 2, or a suitable rectifier. A full-wave rectifier R (Figs. 3, 4 and 5) of the copper oxide or copper sulphide type, has been found very suitable, but mercury vapor rectifiers can also be used. Figures 3, 4 and 5 show diagrammatically the means for furnishing suitable operating current to the vibrating hopper H from a source of alternating current through a transformer T and rectifier R. Referring to Figs. 1 and 2, there is shown a tobacco confining and feeding hopper H of the type disclosed in copending application, Serial No. 98,188, filed August 27, 1936 by James P. Durning for Feed for cigar bunch machines. According to Fig. 1, the hopper H is provided with a deck over which tobacco is fed by means of vibratory pulsations imparted to the hopper by means of a reciprocating electric motor having an armature portion A mounted on the underside of the hopper deck coacting with a magnet portion M secured to a base B suitably mounted on support member F. The hopper is resiliently mounted by means of energy storing members, such as springs S on base F. Also attached to base F are insulating blocks B and $B_1$, which carry parts of a spring contact C, which contact is responsible for the making and breaking of the electric circuit, controlling the operation of the reciprocating electric motor composed of magnet M and armature A. The contact is made and broken by the movement of the hopper and its deck through a contact opener O attached to the underside of the hopper H, engaging the ends of the contact member D mounted on block B, so that during the reciprocation of the hopper H, member O bears against the contact member D on block B, and moves it away from block $B_1$ to separate contacts C and break the circuit. Due to the resiliency of the contact making member D, the contacts C are moved back into engagement with each other on the forward reciprocation of the hopper H. In Fig. 2 a similar structural arrangement is shown except that the contact is closed by reason of the magnetic pull exerted by magnet M on armature A whereas in the device of Fig. 1, the converse is true. In this manner it is evident that the contact may be arranged either to interrupt the current through the magnet coil M as in the device of Fig. 1, or to short circuit the coil M. In the device of Fig. 1, the contact D is shunted by means of a suitable condenser $C_1$ and resistor $R_1$ to reduce arcing. In the second case, that is, the mechanism shown in Fig. 2, a resistor $R_2$ is connected in series with the coil M and contact D to prevent short circuiting of the current source or generator G. A switch $S_1$ is employed for closing the circuit.

The circuits shown in Figs. 3, 4 and 5 operate on the same principle as that shown in Fig. 1, i. e., the pull of the magnet M opens the contact. In Fig. 3 a full-wave rectifier R connected to a transformer T is substituted for generator G of Fig. 1. In Fig. 4 the contact is connected between the secondary winding of the transformer T and the rectifier R, therefore, the current through the contact is alternating while the magnet current is direct.

Any contacts interrupting a highly inductive D. C. circuit, even when properly shunted with condensers and resistors, will show a tendency towards transfer of metal from one contact point to another. However, this deterioration of contacts can be reduced by a proper choice of contact materials. Although many metals and alloys are suitable for this purpose, I have found that an alloy of platinum and iridium, readily available on the market, gives good results. If the deterioration of the contacts is still too rapid, it can be largely retarded by frequent reversal of the connections to the contact points, which may be done automatically by a switch, of the type shown in Figs. 9 to 12, connected in the magnet circuit in the manner shown in Fig. 5. Another method available when using a rectifier R, such as shown in Figs. 3, 4 and 5, is to connect the contact in the alternating current input to the rectifier R while the magnet M is permanently connected to the output as shown in Fig. 4.

A contact construction, which gives quiet and efficient operation, may take the form of a device shown in detail in Fig. 6, and also in Fig. 13 where it is connected for operation with the tobacco feeding hopper. A support B, shown in Fig. 6, is formed of a block of insulating material and is attached to the base of the vibratory unit, preferably to the contact box 14 forming a part of the hopper base frame F. Upon block B are mounted a contact screw 15, a flat contact spring 16, and a flat guide spring 17, mounted substantially at right angles with block B, provided with a groove or hook 18 into which is inserted the free end of the contact spring 16. Spring 16 carries a contact 19 arranged to engage with the top end of contact screw 15. According to Figs. 6 and 7, spring 17, shown in full lines, is moved to a position where it maintains spring 16 flexed so that contacts 15 and 19 are in engagement and current will flow through the circuit. As shown in dotted lines in Fig. 6, spring 17 has been allowed to move to the left and in so doing makes it possible for spring 16 to tend to straighten out and move contact 19 away from contact 15. It will be seen, therefore, that spring 16 is flexed with a rolling motion along a line substantially parallel to block B so that the making and breaking of the circuit by means of the relative movements of contacts 15 and 19 is progressive, and practically all danger of chattering is obviated.

Mounted upon hopper H, as shown in Figs. 6, 6a and 13, is an arm 20 provided with an adjustable thumb screw 21, bearing against a pusher rod or other suitable control means for making and breaking a circuit. Referring to Fig. 6, it will be apparent that rod 22 is slidably mounted in bearing 23 in casing 14 so that during the vibration of the hopper, thumb screw 21 will be moved backwards and forwards against the rod 22, cause it to intermittently flex spring 17, and thereby control the movement of contact spring 16 into and out of circuit making position. Spring 17 is always held in engagement with rod 22 by the pressure exerted by spring 16. When the magnet M is energized, bracket 20 may move either to the left or right allowing the contact members 15 and 19, because of the relative movement of spring 17 and rod 22, to open or close contact C and thereby break or make the circuit through the magnet M. The springs S, between the hopper H and base F return bracket 20 to its original position re-engaging the contact members 15 and 19, and inertia gives the hopper H and bracket 20 movement beyond this position to the right as shown in Fig. 7 rolling spring 16 against block B. In the preferred embodiment contact screw 15 is so adjusted with respect to spring 16 that it just makes contact with the button 19 on spring 16 without lifting the spring 16 off the block B. Not only does this result in very quiet operation but it also prevents any chattering of the contacts 15 and 19, which is usually one of the chief causes of arcing and deterioration of the points. Due to the fact that the spring 16 rests firmly against block B, it cannot vibrate at any frequency higher than that of the vibrator, so that chattering, which is nothing more than high frequency vibration of the contact points at the moment of making and breaking, is practically eliminated. The amplitude of vibration is most conveniently controlled by adjustment of thumb screw 21 in its support arm 20, but rheostats controlling the current through the magnet coil M can also be used, if desired.

I have found that an additional stability of the vibrator can be obtained by using an auxiliary contact similar to Fig. 6 in series with the main contact but mounted in reverse position. This mechanism assumes the form of a second thumb screw 21a mounted in arm 20 bearing against the pusher rod 22a of the auxiliary contact, which rod is mounted in exactly the same manner as rod 22 in a bearing formed by contact box 14a (Fig. 6a). The spring 16a of the auxiliary contact, of course, will then curve up whenever the spring 16 of the main contact flattens down and vice versa. The auxiliary contact, therefore, can be adjusted so that it remains closed so long as the amplitude does not exceed the desired amount but opens at the end of each forward stroke to the right of the thumb screw 21 if the amplitude tends to increase. The same amplitude controlling effect can be obtained by adding a slide 27 to the main contact, as shown in Fig. 7. The vibrator is again adjusted to the required amplitude under the maximum load with the slide 27 moved to the left out of engagement with spring 16. Then the slide 27 is moved to the right until the edge thereof just touches the spring 16 at the end of each return stroke and secured there. If under no-load conditions the amplitude tends to increase, the contact spring 16 will rock on the edge and open the contact 15 a second time as indicated in dotted lines. In actual operation the stroke never builds up beyond the point at which the contacts just open twice in each cycle.

If desired, the contacts I have described above, can be modified in several ways, for example, more than one contact screw can be mounted in support block B and a corresponding number of contact points provided on spring 16 in order to short circuit resistor R1 in several steps instead of all at one time. This can be carried to the point where the resistor R1 takes the place of block B, as illustrated diagrammatically in Fig. 8, where the resistor is gradually cut in and out by the spring 16 engaging different portions of the resistor as it curves up or flattens down in response to the movement of a lever 29 which moves in unison with the armature A of the reciprocating electric motor. In this modification lever 29 is pivotally mounted on the armature support of hopper H so that during the vibration of the hopper there is a relative pivoting movement of the lever 29 as spring contact 16 is flexed into and out of engagement with resistor R1. Lever 29 can be provided with a notch 290 in which rests the free end of spring contact 16 and a coil spring 30 can be used to engage the notched arm and maintain the end of the spring contact in engagement with the notch 290. The principle of operation of this modification described as shown in Fig. 8, remains unchanged because the vibrator always operates at the natural frequency determined by the weight of the parts and the characteristics of the springs S.

In order to prevent rapid deterioration of the contacts, I have found that the provision of a reversing switch, as referred to above, is satisfactory for that purpose. This mechanism may take the form shown in Figs. 9 to 12, inclusive, in which a holder 33 carrying two single-pole, double-throw mercury switches 24 is mounted in any convenient manner on a sleeve 31 turnable on a stud 32 affixed to the machine frame F2. A shaft 36 is mounted in frame F2 and is rocked by an arm 37 connected thereto, actuated by any convenient reciprocating member of the machine. Attached to shaft 36 is a crank 38 which transmits the motion of the reciprocating member to a link 39 pivoted thereto at one end by a pin 40 and slidable by means of a slot 41 on a reduced portion of stud 32 at the other end. Link 39 is held in place on stud 32 by means of a nut 42. Between blocks 43 attached to link 39 is held a flat spring 44 in such a position that at each forward motion of the link 39 it engages with the cam 35 and turns the same through a predetermined angle, as shown in the dotted lines of Fig. 9 thereby throwing the mercury switches and reversing the contacts therein. Cam 35 is provided with horizontally extending pins which engage the link 39 and act as stops at the ends of the stroke of cam 35.

The invention above described may be varied in construction within the scope of the claims, for the particular device, selected to illustrate the invention, is but one of many possible concrete embodiments of the same. It is not, therefore, to be restricted to the precise details of the structure shown and described.

What is claimed is:

1. An electric control switch comprising a support, a contact on said support, an elongated flat spring fixed to said support and extending thereover in engagement with a portion of said support, a second contact mounted upon said spring and located to engage said first-named contact, a device for tensioning said spring to maintain said contacts in engagement, and means for moving one end of said spring in a line substantially parallel with said support for alternately reducing and increasing the tension on said spring while said spring engaging said support is maintained flat therealong whereby it may move upon and along a part of said support with substantially a rolling action for making and breaking a circuit.

2. An electric control switch comprising an elongated support with a supporting surface, a contact on said support, an elongated flat spring fastened to a portion of said surface and extending along and in contact with said surface, a second contact mounted on said spring and adapted to engage with said first-named contact, mechanism for intermittently moving said spring into and out of engagement with said first-named contact, said mechanism including a member engaging the free end of said spring, and means for moving said member in a line substantially parallel to the surface of said support for flexing said spring with a rolling motion upon and along said surface of said support to thereby open and close said contacts.

3. An electric control switch comprising a support having a spring supporting surface, a contact mounted on said support, an elongated spring fastened to said surface at one end of said support, a second contact mounted on said spring, said spring extending along and in contact with said support and positioned with said contacts in substantial alignment, mechanism for intermittently flexing said spring to engage and disengage said contacts, said mechanism including a member engaging the free end of said spring, means for positioning said member at substantial right angles to said support, a frame supporting said switch, and a device projecting through said frame and coacting with said member for moving said member and flexing said spring with a rolling motion along a part of said surface of said support into and out of contact making position.

4. In an electric control switch for a vibratory conveyor, an elongated support, a contact mounted on said support, an elongated flat spring member fastened to one end and extending along and partly in engagement with said support, a contact mounted on said member and arranged to engage said first-mentioned contact, a slide adjustably mounted for movement along said elongated support beneath said member, a device arranged to engage the free end of said member, means for moving said device in a plane substantially parallel to the longitudinal axis of said support to cause said member to flex along said support to effect a relative movement between said contacts for making and breaking a circuit, and for moving said member into engagement with said slide for breaking said circuit and stabilizing the operation of said conveyor whenever the amplitude of movement of said device causes said member to be flexed along said contact in excess of a predetermined amount.

5. A switch of the make and break type for use with a vibratory conveyer comprising, an elongated support, a contact mounted on said support, a flexible circuit making and breaking member fixed to said support extending along, and in engagement with a part of said support, a second contact mounted on said flexible member and positioned to engage and disengage said first-mentioned contact, an operating element engaging the free end of said flexible member and constructed and arranged to move said end of said member in a path substantially parallel with the longitudinal axis of said support while the part of said spring engaging the part of said support is maintained flat therealong to flex said member with a substantially rolling movement along said support and thereby engage and disengage said contacts, means for directing a current through said switch in one direction, and means for reversing the current through said switch.

6. In a vibratory conveyer having a material conveying deck, a reciprocatory electric motor associated with said deck for vibrating the same, an electric circuit, and a make and break electric switch connected in said circuit, a switch control mechanism for operating said motor by making and breaking said circuit, comprising a support with a supporting surface, a contact on said support, an elongated flat circuit closing member fixed at one end to a portion of said surface and extending therealong and movable into and out of engagement with said contact, means tending to maintain said member and contact engaged including, a device engaging the free end of said member, and a reciprocatory rod adapted to cooperate with and move said last-named means for effecting relative movement between said device and member to move the latter with a substantially rolling motion along said support for opening and closing said circuit.

7. A make and break switch for use with a vibratory tobacco feeding hopper having a depending switch operating arm comprising an elongated support, a contact mounted on said support, an elongated flat spring fastened to one end of said support extending along a surface thereof and in engagement with a portion of said surface, a contact mounted on said spring and arranged to engage said first-mentioned contact on said support, an element supporting the free end of said spring, an arm on said hopper, and means engaged by said arm and coacting with said element and movable in a line substantially parallel with the surface of said support for displacing said element to flex said spring and cause it to roll along said support to intermittently engage and disengage said contacts.

8. In a tobacco feeding mechanism having a hopper provided with a deck for feeding a stream of material, a base, and means mounting said hopper on said base for vibratory movement relative thereto, and a device for controlling the vibratory action of said hopper including a reciprocatory electric motor, a control switch for making and breaking the circuit through said motor, said switch comprising a support with a supporting surface, a contact on said support, an elongated flat spring fixed at one end of said support and extending along and in contact with a portion of said surface, said spring being provided with a complementary contact arranged to engage said first-named contact, a yieldable member fixed at substantially right angles to said surface and at the other end of said support, means on said member engaging the free end of said spring, a casing enclosing said switch, and a pin slidable in said casing engaging said member for effecting relative movement between said spring and support to flex said spring along said surface and rapidly make and break said circuit.

WILLIAM C. BROEKHUYSEN.